United States Patent [19]
Royal

[11] 3,922,533
[45] Nov. 25, 1975

[54] METHOD OF LOCATING A RADIATING TARGET

[75] Inventor: Douglas E. Royal, Palos Verdes Estates, Calif.

[73] Assignee: TRW Inc., Redondo Beach, Calif.

[22] Filed: Jan. 28, 1975

[21] Appl. No.: 544,726

Related U.S. Application Data

[63] Continuation-in-part of Ser. No. 453,900, March 22, 1974, abandoned, which is a continuation of Ser. No. 281,319, Aug. 17, 1972, abandoned.

[52] U.S. Cl..... 235/150.27; 235/150.26; 343/112 R; 343/113 R
[51] Int. Cl.²..................... G01S 5/06; G06F 15/50
[58] Field of Search..... 235/150.25, 150.26, 150.27; 444/1; 343/112 R, 112 C, 113 R, 5 DP

[56] References Cited
UNITED STATES PATENTS

| | | | |
|---|---|---|---|
| 3,289,207 | 11/1966 | Lent | 343/112 R |
| 3,495,260 | 2/1970 | Laughlin et al. | 343/112 R |
| 3,697,997 | 10/1972 | Cooper | 343/113 R |
| 3,705,936 | 12/1972 | Wilmot et al. | 343/5 DP |
| 3,710,331 | 1/1973 | Kiisk | 235/150.27 |
| 3,718,927 | 2/1973 | Howard et al. | 343/5 DP |
| 3,727,218 | 4/1973 | Cantwell et al. | 343/5 DP |
| 3,812,493 | 5/1974 | Afendykiw et al. | 343/112 R |
| 3,863,256 | 1/1975 | Smith | 235/150.27 |
| 3,864,681 | 2/1975 | Olive | 235/150.27 |

*Primary Examiner*—Felix D. Gruber
*Attorney, Agent, or Firm*—Daniel T. Anderson, Esq.; Edwin A. Oser, Esq.; Jerry A. Dinardo

[57] ABSTRACT

A method of locating a radiating target which eliminates the principal source of error of conventional systems. Thus, the target location can be determined on the basis of relative bearing angles which are quite erroneous. A platform such as an airplane is moved along an arbitrary flight path while relative bearing angles to the target are determined by means of the radiated wave. For different positions of the platform both the heading of the platform with respect to a known point, and the location of the platform with respect to a known landmark are determined. Then a first pair of positions of the platform is identified in an automatic manner, each having the same first relative bearing angle. Then the same procedure is repeated for identifying a second pair of positions, each having the same second relative bearing angle to the target. For the first two positions of the platform a first circle may be calculated from the distance between the first two positions and the included angle from the first two positions to the target. Similarly a second circle may be calculated passing through the third and fourth positions. The target is then located at the coordinates of the intersection of the two circles. Various modifications of this method are also disclosed.

14 Claims, 18 Drawing Figures

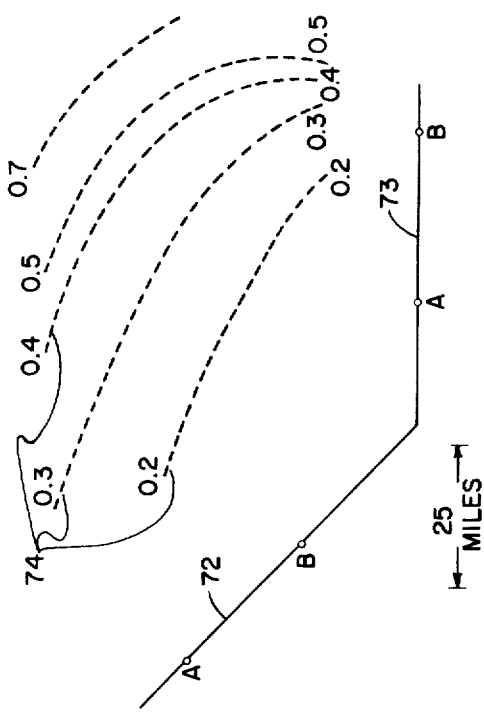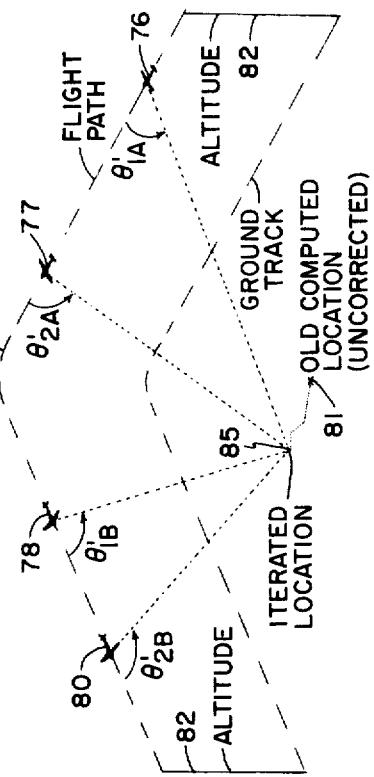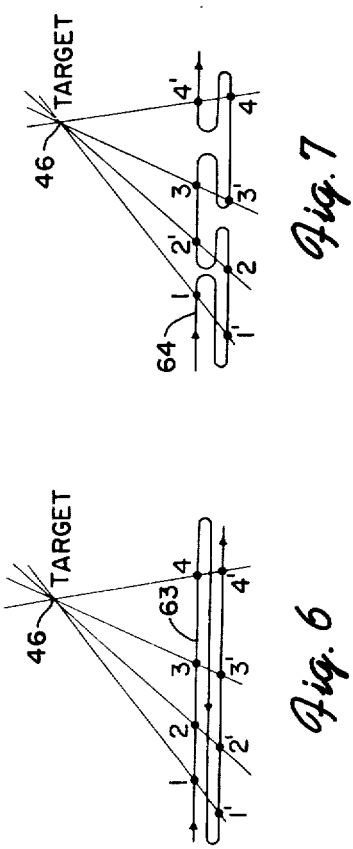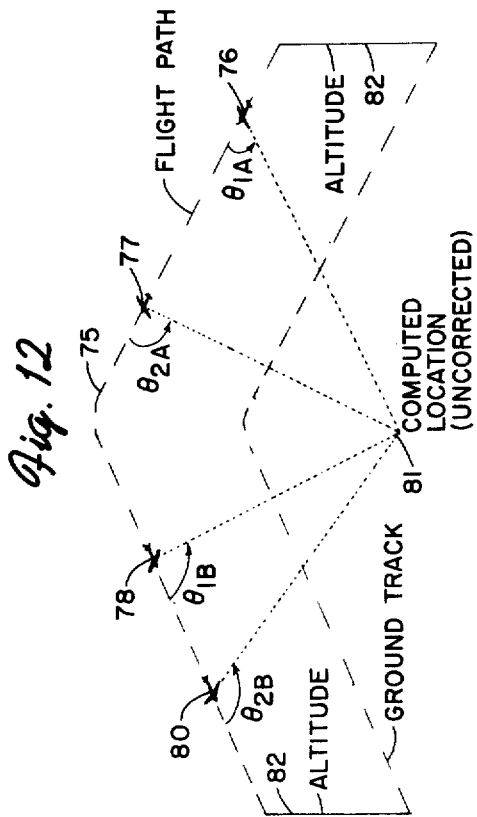

METHOD OF LOCATING A RADIATING TARGET

This is a Continuation-In-Part of my prior copending application Ser. No. 453,900, filed Mar. 22, 1974, and now abandoned, which in turn is a Continuation of my prior application Ser. No. 281,319, filed Aug. 17, 1972, now abandoned.

BACKGROUND OF THE INVENTION

This invention relates generally to a method of locating a radiating target, and particularly relates to a method of target location by means of relative bearing angles at different positions of an airplane for which the location and heading of the plane are determined.

It is conventional practice to locate a radiating target from a moving platform by a triangulation procedure. Thus, at various points of a flight course a bearing to the target is obtained by some direction finding equipment. The intersecting point of the direction finding bearings, at least in theory, determines the location of the target.

However, it has been discovered that such a conventional target location method produces large errors in the location of the target. Present day navigational equipment is very accurate and therefore both the heading and the location of the aircraft for each point where a bearing to the target is taken may be very accurately determined.

On the other hand it has been found that direction finding equipment produces large errors when an attempt is made to locate a radiating target. Thus, the antenna portion of the direction finding system must be located for aerodynamic or other reasons where signal re-radiations from the wings, the engines or other airframe portions substantially degrade the performance. In the frequency range extending from high frequency through several hundred megahertz, a different source of bearing measurement error usually predominates. This is caused by the current flow on the surface of the airframe. This surface current directly couples into the direction-finding antennas and also can degrade the bearing accuracy.

Thus, in the past it has been necessary to calibrate each individual aircraft for any particular frequency or for the polarization of the radiated wave. Such calibration data also depend on the aspect angle of the airplane, that is they should be carried out for any relative angle between the target and the aircraft. Actually, the calibration data may be changed by the simple fact of changing a pod of the aircraft or removing and replacing service hatches of the airplane. This flight test data can usually not be extrapolated and may have to be updated frequently. It will also be obvious that the surface current resonances of the airplane structure may vary due to these small changes of the aircraft structure. Therefore, such calibration tests must be carried out for each individual airplane.

It is accordingly an object of the present invention to provide a radiating target locating method which is not subject to the bearing errors of prior art systems.

A further object of the present invention is to provide a method of locating a target radiating a wave such as an acoustic or electromagnetic wave which actually utilizes the error necessarily present when determining the direction of arrival of a wave from a target and which may be called a phi match method.

A further object of the invention is to provide a method of locating a target by recording the relative bearing angles during the flight path of an aircraft while also recording the location and heading of the aircraft so that the target may be subsequently determined from the recordings made during flight.

SUMMARY OF THE INVENTION

A target radiating a wave may be located in accordance with the present invention by means of a platform moved along an arbitrary flight path in the vicinity of the target. The platform may be an airborne, land or seaborne vehicle or even a satellite. The platform carries equipment for obtaining and recording bearing angles, heading and location data and additional equipment for operating upon the data, including identifying identical bearing angles. The method is carried out automatically and includes the following steps:

The relative bearing angles to the target are recorded for different positions of the platform. It is well known that these bearing angles may contain large errors unless they are corrected. Similarly, for different positions of the platform the heading thereof with respect to a known point is recorded as well as its location with respect to a known landmark or its geographical position. Now a first pair of positions of the platform is identified, each having the same first relative bearing angle to the target. Similarly, at least a second pair of positions of the platform is identified, each having the same second relative bearing angle to the target.

On the basis of these data the location of the target can be calculated. This is effected by calculating a portion of a first circle which passes through the first two positions of the platform and the target. This circle is calculated on the basis of the distance between the first two positions and the included angle from the first two positions to the target. Similarly, a portion of a second circle is calculated passing through the third and fourth positions of the platform and the target. The second circle is similarly calculated from the distance between the third and fourth positions and the included angle to the target. The target location is now uniquely defined by the coordinates of the intersection of the two circle portions. The calculation may be effected by means of two equations which define the two circles.

This method may be used with phase-comparison direction finding equipment, amplitude-comparison direction finding equipment or hybrid combinations thereof.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 2b is a block diagram of the equipment necessary on the ground for reducing the data obtained from the airborne equipment of FIG. 2a;

FIGS. 6 and 7 illustrate still further flight paths which may be utilized for carrying out the method of the present invention;

FIG. 11 illustrates a family of error curves about a particular flight path to show the calculated mean error of the method of the invention;

FIG. 12 illustrates a flight path and target and the measured relative bearing angles in two dimensions;

FIG. 13 illustrates a flight path as shown in FIG. 10 with the target location corrected for the error caused by the altitude and position of the aircraft during the flight path.

DESCRIPTION OF THE PREFERRED EMBODIMENTS

Figure 1:
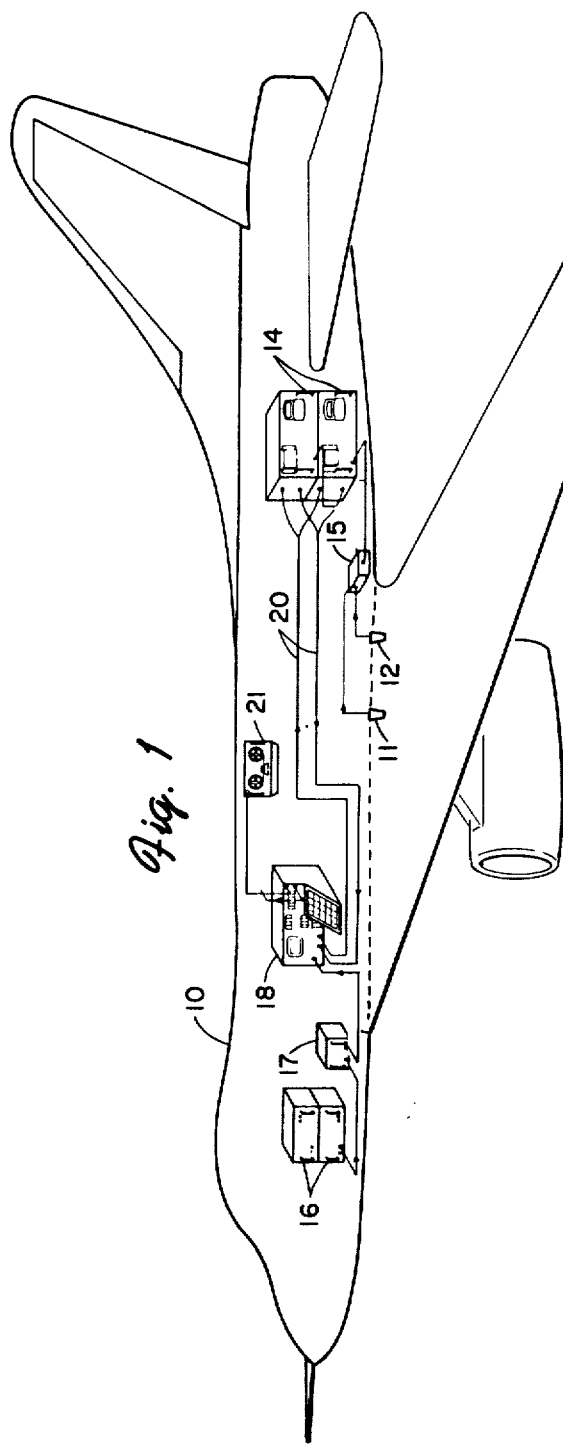
FIG. 1 is a view in perspective of an airplane carrying the equipment necessary for performing the method of the present invention.

Referring now to the drawings and particularly to FIGS. 1, 2a, 2b, and 3, there is shown by way of example apparatus which may be utilized in practicing the method of the present invention. As shown particularly in FIG. 1, there may be provided a moving platform such as an airplane 10 for carrying the necessary navigation and receiving equipment. The platform 10 is moved along an arbitrary flight path which may even be effected automatically. Instead of the airplane 10 it will be obvious that any other moving platform may be provided such, for example, as a helicopter, or satellite vehicle programmed to fly in a particular path, as will be described hereinafter. Alternatively, a vehicle moving on the ground or seas, a free balloon or the like may also be used.

Disposed in the airplane 10 is the equipment required for practicing the invention which includes a pair of antennas 11 and 12 for receiving the radiation emitted by the target. Thus, the target may radiate an acoustic wave or else an electro-magnetic wave. For convenience it will be assumed that the target radiates an electromagnetic wave which may be in the high-frequency or ultra-high-frequency range. The purpose of the two antennas 11 and 12 is to determine the direction of arrival of the radiated wave. In other words, it is possible to determine the phase angle between two waves received by the two antennas and this is usually called the phi angle. Therefore, the method of the present invention may be referred to as the phi match method. In its broad sense phi refers to any determinate function of the relative bearing from the aircraft to the target.

The signals from the two antennas 11 and 12 may be routed into a receiver 14 by means of a hybrid junction 15 which, however, may be omitted. This may be considered to be a device for routing the signals from the two antennas properly into the receiver 14.

Disposed in the cockpit of the airplane there may be standard navigation equipment shown at 16 connected to a dynamic digital control unit 17. The data received from the receiver 14 and from the digital control unit 17 may be impressed on a display and control assembly 18 which may also have provisions for tuning and controlling the receiver 14 by means of leads 20. It will be appreciated that all of this equipment is conventional including a data recorder 21 which makes it possible to record continuously both navigational data and the phi angle from the target.

Figure 2A:
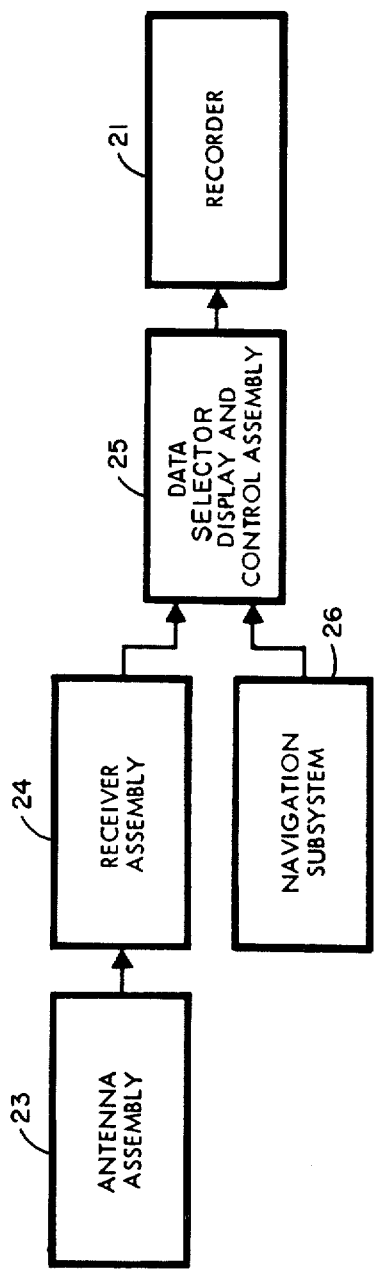
FIG. 2a is a block diagram of an airborne system for carrying out the method of the invention.
Figure 2B:
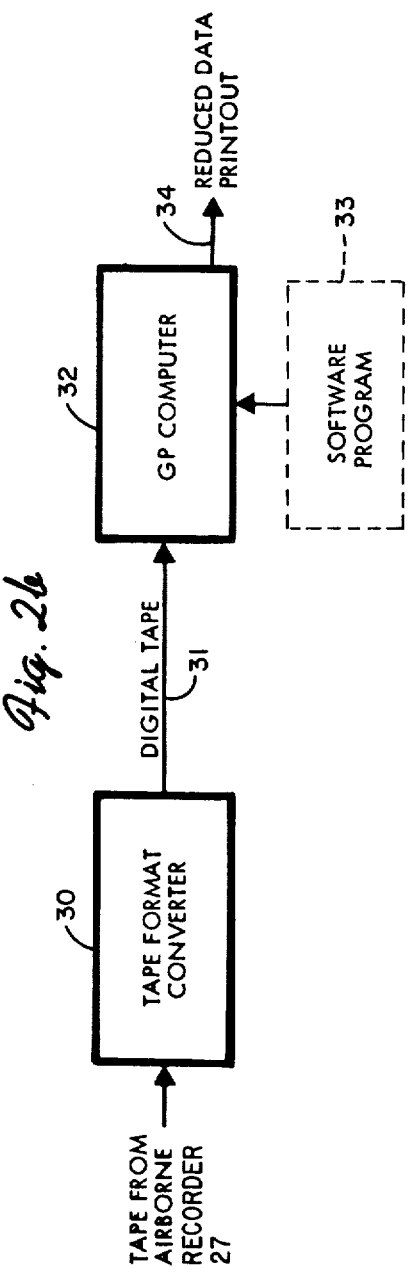

The basic elements of a system for practicing the present invention are shown in FIGS. 2a and 2b to which reference is now made. The airborne portion of the system is shown in FIG. 2a and includes an antenna assembly 23. This may, for example, include the two antennas 11, 12 with their hybrid junction 15. The antenna assembly 23 feeds a receiver assembly 24 which in turn is connected to a data selector display and control assembly 25. Concerning the antenna assembly 23 and the receiver assembly 24, reference is made to the applicant's prior U.S. Pat. Nos. 3,246,331 (Royal I) and 3,392,291 (Royal II). In particular the patent to Royal I shows in FIG. 4 a complete block diagram of a direction finder antenna apparatus and a description thereof is found in the specification. The patent to Royal II also shows similar equipment in block form (see FIGS. 4, 5, 7 and 8). The data selector 25 may include conventional electronic equipment for identifying, for example, identical bearing angles or for correlating antenna patterns as will appear hereinafter. Electronic comparators for comparing two signals are well known in the art as are electronic correlators for correlating, for example, the antenna patterns.

The raw data from the recorder 27 may then be fed into a ground based tape format converter 30 which edits the raw data from the recorder 27. This may then be stored on a digital tape as indicated at 31 which in turn feeds into a general purpose computer 32 controlled by a software program 33. The reduced data is printed out as indicated by the line 34. This system assumes that the moving platform, such as the airplane 10, simply records both navigation data and the phi angle to the target and that the data is later analyzed by a computer.

Equipment capable of performing the functions identified in FIGS. 2a and 2b is the AN/ASQ-26 electronic reconnaisance set available from TRW Inc. The navigation subsystem 26 of FIG. 2a is obtainable from Litton Industries and is identified by AN/ASQ-46–56 inertial navigation set. Alternatively, the AN/ALA-6 antenna system available from Hoffman Laboratories Inc. coupled with the AN/APR-14 receiver system obtainable from Raytheon Inc. may be used for the antenna assembly 23 and receiver assembly 24. The recorder 21 is obtainable from Leach and is identified by QRC-310 tape recorder. The IBM 7094 computer system is suitable for the general purpose computer 32 of FIG. 2b.

It should be noted that the navigation subsystem serves the purpose to determine the location of the airplane with respect to a known landmark. This may, for example, be the geographic location of the platform. This can be obtained from any well known navigation system. Furthermore, the navigation subsystem such as 26 will determine the heading of the platform with respect to a known point. Such a known point may in general be true north and may be obtained from a navigation compass. Thus, during the flight path it is feasible to record the heading of the airplane say with respect to true north and the geographic location of the platform for any point for which the phi angle to the target is determined.

Figure 3:
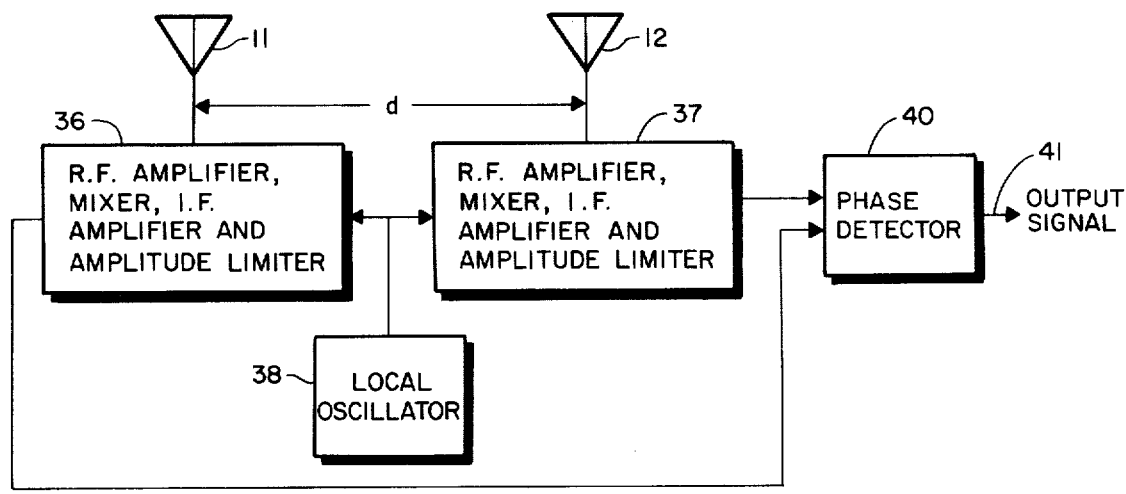
FIG. 3 is a block diagram of equipment shown by way of example which may be used for carrying out the method of the present invention.

Referring now to FIG. 3, there is shown in more detail the receiver assembly 24 of FIG. 1. This again includes two spaced antennas 11 and 12. As shown in FIG. 3, the two antennas have a spacing d from each other. Each antenna 11 and 12 feeds into an identical unit 36 and 37. Each unit includes a radio-frequency amplifier, mixer, intermediate-frequency amplifier and amplitude limiter. Accordingly, the output of each unit 36 and 37 is an electromagnetic wave at the intermediate frequency with a constant amplitude. A local oscillator 38 is provided which is coupled to both units 36 and 37 so as to mix the radio-frequency wave with the oscillator wave to derive the intermediate-frequency wave.

The two intermediate frequency waves of constant amplitude are fed into a phase detector 40 where their phases are compared. The output signal of the phase detector 40 is obtained from a lead 41. This phase angle or phi angle indicates the relative bearing angle to the target. It is indicative of the true direction to the target. However, it may not and usually does not indicate the actual relative bearing direction to the target because of the errors previously mentioned. In accordance with the present invention it is assumed that if the relative bearing angles are identical at two points of the flight path of the airplane, as evidenced, for example, by the phase angles being identical, it is then possible to determine the location of the target without knowing the true direction to the target.

A paper which appears in IEEE Transactions on Aerospace and Electronic Systems, Volume AES-7 No. 1, Jan. 1971, pages 188 - 203 is entitled "An Analysis of Wide-Band Microwave Monopulse Direction-Finding Techniques." This paper deals generally with direction-finding techniques by radar pulses. Reference is particularly made to FIG. 1 on page 189, the antenna array shown in FIG. 3 on page 191 and FIG. 9 on page 193 for a monopulse direction-finding system. Attention is also directed to FIG. 13 on page 195 showing a two-channel monopulse direction-finding system and to FIG. 22 on page 199 which illustrates a single-plane phase interferometer monopulse direction-finder system. These figures show various direction-finding systems which operate by phase comparison or amplitude comparison and with two or three channels. This paper explains in more detail the equipment shown in FIG. 3.

Figure 4:
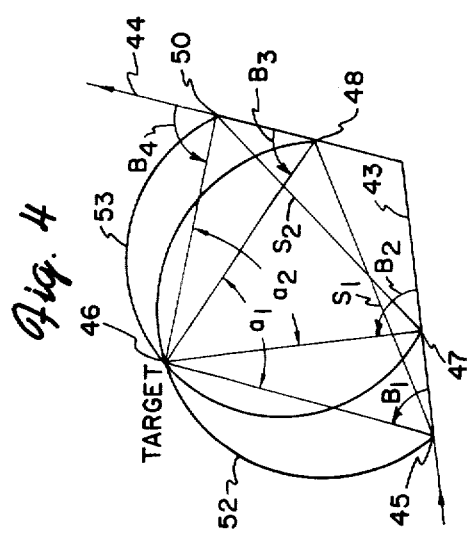
FIG. 4 illustrates a flight path, a target and portions of two circles which determine the location of the target in accordance with the present invention.

Referring now to FIG. 4, there is shown by way of example a flight path consisting of two portions 43 and 44 which may be assumed to be straight and which form an angle with each other. As the airplane passes along the flight path 43 it will reach a position 45. At this point 45 a relative bearing angle $B_1$ is measured or determined by the equipment shown in FIGS. 1, 2a, 2b and 3 between the heading of the airplane $H_1$ which may coincide with the plane's flight path and the direction to the target assumed to be at 46.

Consequently, as the airplane proceeds along the flight path 43 it will reach a second position 47. Here the relative bearing angle $B_2$ is measured, that is the angle between the heading of the airplane and the relative bearing direction to the target. Eventually, the airplane will reach a position 48 on the second leg 44 of its flight path. Here a relative bearing angle $B_3$ may be measured between the airplane heading and the relative bearing direction to the target. Similarly, at the fourth position of the airplane 50, the relative bearing angle $B_4$ may be measured.

Assuming now that the relative bearing angles $B_1$ and $B_3$ are equal while the other two bearing angles $B_2$ and $B_4$ are also equal, it is now possible to determine the included angle $\alpha_1$ between the positions 45 and 48 and the target 46. Assuming further that $s_1$ is the distance between points 45 and 48, a circle can be constructed determined by $s_1$ and the included angle $\alpha_1$. The circle has a radius of $$R_1 = \frac{s_1}{2|\sin\alpha_1|}$$

The center of the circle is on a line perpendicular to and bisecting the distance $s_1$. The portion of this circle passing through points 45, 48 is shown at 52. It passes through the points 45 and 48 and it is known that the target is located at the circumference of circle 52.

Similarly, a second circle 53 or a portion thereof can be constructed through the points 47 and 50. In this case the distance between these two points may be called $s_2$ and the included angle $\alpha_2$. The target 46 is located at the intersection of the two circles 52 and 53. The two angles $\alpha_1$ and $\alpha_2$ are given by the change in the aircraft heading, that is by $H_3-H_1$ and $H_4-H_2$ respectively with a correction for north convergence applied as may be required. This is so because the vertex angle $\alpha$ is given by the change in heading plus the change in relative bearing, and the latter change is zero.

Therefore, it will be seen that all that is necessary to determine the location of the target is to fly along a flight path in the vicinity of the target and to find two pairs of points, each pair having the same relative bearing angle. There is no need to determine the true bearing angle to the target. It may be noted furthermore, that the true heading need not be known since only the heading changes are used. One way of looking at the method of the present invention is to say that the entire airplane is used as the direction finder to determine the direction to the target.

It will be understood that the points 47 and 48 may be exchanged along the flight path. In other words it is possible to determine first two points or positions along the flight path having the same relative bearing angle and subsequently another pair of points or positions with an identical relative bearing angle different from that of the first pair of points.

Figure 5:
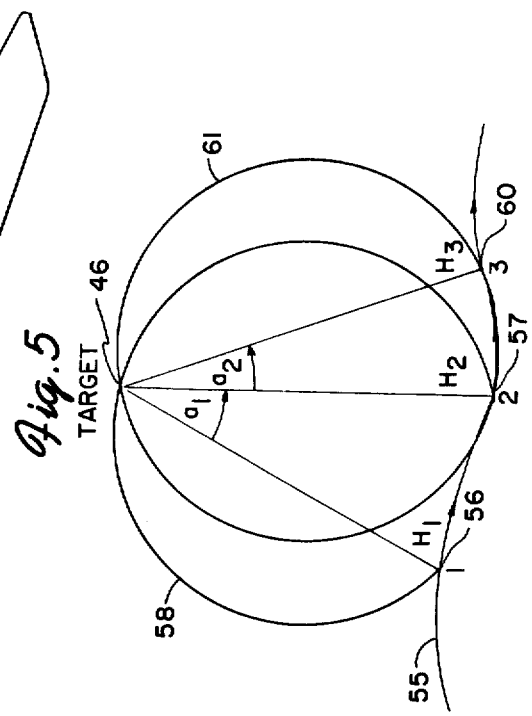
FIG. 5 illustrates another flight path which may be used in accordance with the method of the present invention for locating a radiating target by determining two circle portions.

The actual flight path used makes no difference just as long as it is possible to find three or four positions with either identical or with two pairs of identical relative bearing angles. Thus, as shown in FIG. 5 the flight path 55 may be oscillatory. The target is again located at point 46. At the first position of the airplane at 56, the relative bearing angle is measured at a heading $H_1$.

At a second position 57 having a heading $H_2$ the identical relative bearing angle is measured. Accordingly, a circle 58 may be constructed in the manner previously explained passing through points 56 and 57 and having an included angle $\alpha_1$ to the target 46. At the third airplane position 60 the airplane heading is $H_3$ and the relative bearing angle is identical with that of the first two points. Accordingly, a second circle 61 may be constructed passing through points 57 and 60 and having the included angle $\alpha_2$. The target 46 is defined by the intersection of the two circles 58 and 61.

It should be noted that in this case instead of having two pairs of identical bearing angles all that is necessary is to have three points or positions with an identical relative bearing angle at each point.

It is to be understood that the target is defined as the intersection of two circles. Actually, it is only valid to construct that portion of the circle lying above the two points 56 and 57 or 57 and 60 respectively. However, there may be a degenerate case where the two valid circular portions intersect at two points. In that case there is an uncertainty of the location of the target.

If that should happen all that is necessary is to construct a third circle to remove this uncertainty. It may also be desirable to construct a third circle because this will indicate the error of locating the target because the three circles will not intersect at precisely the same point in the presence of errors.

Actually, the signal loci are not constructed but the target location is computed by a simple formula for the two circles. The target is then simply defined by the coordinates of the intersection of the two circle portions.

As pointed out before, the actual shape of the flight path is rather immaterial. This will be readily apparent from an inspection of FIGS. 6 and 7. Thus, referring to FIG. 6, a flight path 63 has been depicted which might be called an end-fire flight path. It is actually a closely spaced loop with three parallel portions. At the points indicated at 1 and 1'; 2 and 2'; 3 and 3'; and 4 and 4' pairs of equal relative bearing angles may be measured. The target is shown at 46 and is located by a series of substantially straight lines intersecting the pairs of points with equal relative bearing angles. Since there is no heading difference between positions 1 and 1' the angle $\alpha_1$ (as defined in FIGS. 4 and 5) is zero. Accordingly, the two flight path positions 1 and 1', together with the target 46, lie on a circle of infinite radius. Therefore, the straight line intersecting points 1', 1 and the target represents an arc of this circle of infinite radius. Therefore, the straight line intersecting points 1', 1 and the target represents an arc of this circle of infinite radius.

Actually it is almost impossible to steer an airplane on a perfectly straight line. Therefore, the aircraft heading at any position usually differs at say points 1 and 1'. Accordingly, the angles $\alpha$ are not zero and the circles previously discussed such, for example, as 58 and 61 of FIG. 5 have quite large but finite radii.

An alternate flight path which also produces end-fire operation is shown in FIG. 7. Here the flight path 64 consists of a series of S-shaped segments, each of which permits to determine a pair of equal relative bearing angles such as 1 and 1'; 2 and 2'; 3 and 3'; and 4 and 4'. Otherwise, what has been said in connection with FIG. 6 also applies.

An example of another useful form of flight path occurs when the aircraft is flown such that its relative bearing to the target remains fixed. In the absence of wind effects the aircraft describes a logarithmic spiral and any convenient set of points along the path may be chosen for the construction of circles which permit the location of the target.

Some alternatives to the target locating method of the present invention will now be discussed. For example, it is not necessary to have a single airplane make the observations shown for example in FIG. 4. Thus, it is feasible to utilize two separate aircraft. In this case each aircraft measures the relative bearing angle at each of two separate positions such, for example, as positions 45 and 48 of FIG. 4 measured by one of the two aircraft. The positions should be so selected or the instant of measuring the bearing angle should be so selected that the relative bearing angles are the same for both of the same aircraft positions. This procedure may then be repeated for positions 47 and 50 of FIG. 4 by the other aircraft. This method is particularly advantageous where the target radiates only short bursts of the wave. During each such radiation burst it is feasible to obtain bearing matches at two positions by means of two separate aircraft, thereby to determine the two circles necessary to locate a target.

Figure 2C:
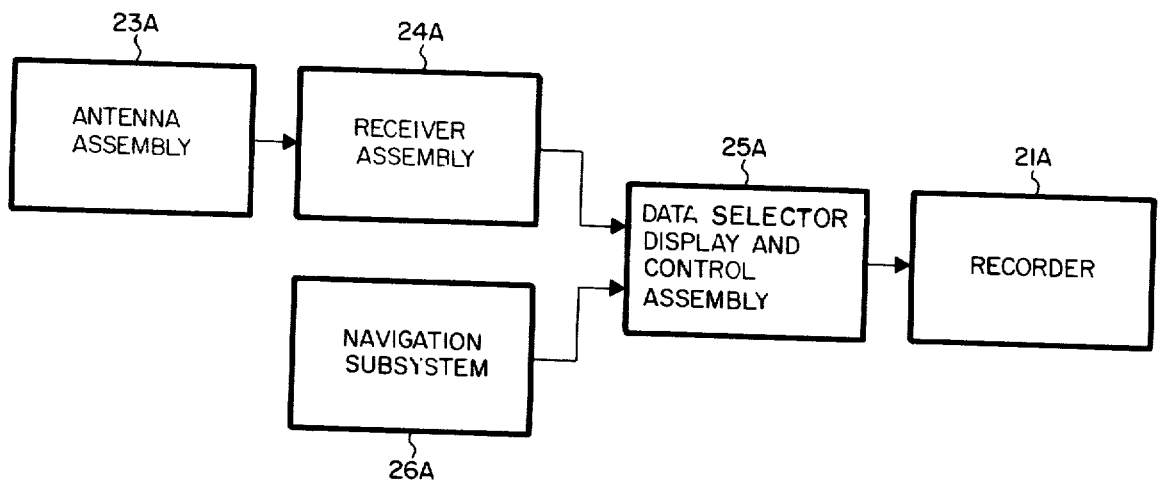
FIG. 2c is a block diagram of a second airborne system which may be utilized where two airplanes are used for practicing the method of the invention.

Each of the two moving platforms or airplanes will require equipment as shown in FIGS. 2a or 2c respectively. In FIG. 2c the blocks of the diagram have been designated by the same reference number followed by the letter A. For example, the antenna assembly 23 of FIG. 2c is identified by 23A. The equipment of FIG. 2b is common to the two airplanes and may, for example, be ground based although this is not necessary.

As previously mentioned the location of the aircraft during each position may be determined by its geographical location. Alternatively, the position or location of the aircraft may be determined with respect to a known landmark which is preferably in the vicinity of the target. Similarly, the heading of the aircraft may usually be determined with respect to true north. Alternatively, it is of course feasible to determine the heading of the aircraft with respect to a known, fixed landmark which is preferably located in the general vicinity of the target.

The method of the present invention may be practiced as indicated before by recording the relative bearing angle for each of the positions and its location such as the geographical location of the plane. This, of course, may be effected while the aircraft is in flight by simply noting the necessary data and then constructing the circles in the manner explained before.

However, as shown by the apparatus of FIGS. 1, 2a and 2b, it is also feasible to record all necessary data on a convenient recorder located on the aircraft. The location of the target may then subsequently be calculated from the recorded data by the computer shown in FIG. 2b at 32.

Figure 8:
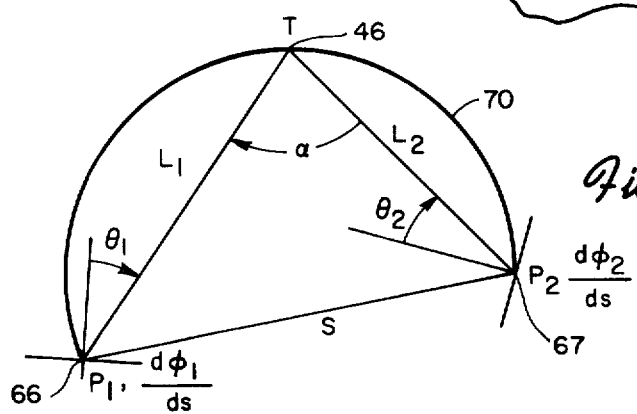
FIG. 8 illustrates a sketch for locating a target by means of two positions only by making use of the rate of change of the phase angles at the two positions.

The method of the present invention may also be modified in the following manner. Thus, it is possible to locate the target by measuring at two points, say $P_1$ and $P_2$ the relative bearing angles to the target as well as the rate of change of the phase angle as a function of distance. This has been shown by the construction of FIG. 8 to which reference is now made. Here the airplane successively moves during its flight path past the point $P_1$ which may be called 66 and thereafter to a point $P_2$ which may be called 67. $s$ indicates the distance between the two points as shown in the sketch. At point $P_1$ the relative bearing angle $\theta_1$ is measured and similarly at $P_2$ the relative bearing angle $\theta_2$ is measured. In FIG. 8 the angles $\theta_1$ and $\theta_2$ are referenced to the transverse axis of the vehicle. These two relative bearing angles are either identical or the difference between them is determinable. Also, from the change of the heading the included angle $\alpha$ to the target is determined.

The relative bearing angles such as $\theta_1$ and $\theta_2$ are measured by the phase angle of the wave received at two antennas such as 11 and 12 of FIG. 3. Hence if the two phase angles measured at points 66 and 67 are the same, it is assumed that the corresponding relative bearing angles are the same. This bearing angle is arbitrary and need not necessarily indicate the direction to the target 68. This is generally true of all modifications of the method of the present invention.

If the relationship between the phase angle and the bearing angle is multivalued, then the identification of the same relative bearing angle for different positions of the platform can be accomplished by using a multibase interferometer. This applies generally to all embodiments of the present invention.

Finally, the rate of change of the phase angle at the two points is obtained which may be expressed as follows:

$$(d\phi_1/ds) \text{ and } (d\phi_2/ds) \tag{1}$$

In this formula $\phi$ is determined as follows:

$$\phi = \beta d \sin \theta \tag{2}$$

where $\beta$ is defined:

$$\beta = (2\pi/\lambda) \tag{3}$$

and $\lambda$ the wavelength of the radiated wave. $d$ is the effective spacing between the two antennas at the airplane (see FIG. 3) and may be a function of $\theta$. $\phi$ may be called an interferometric phase angle.

As shown in FIG. 8, the target T is located at a point 46 on a circle 70 passing through point 66, 67 and 68. The target is defined by the intersection of the circle portion 70 with the two lengths $L_1$ and $L_2$. It can now be shown that the ratio of these two lengths is determined as follows:

$$\frac{L_1}{L_2} = \frac{d\phi_2/ds}{d\phi_1/ds} \tag{4}$$

In other words this ratio is inversely proportional to the two measured rates of change of the phase angle at points $P_1$ and $P_2$. It should be noted that the target point T may be determined with the data given herein, that is by means of the angle $\alpha$ and the known ratio of $L_1$ and $L_2$ as well as the distance $s$.

The method of the present invention may be still further generalized. Thus, it is possible to determine the convergence by using patterns of high spatial activity. Instead of using an interferometer made up of several antenna elements it is feasible to make use of an antenna pattern which produces a distinctive output indication. This distinctive antenna pattern may now be used to determine the vertex angle of the target. It will be realized that the entire airplane structure will contribute significantly to the antenna pattern. This has been shown in FIG. 9 to which reference is now made. The airplane moves in its flight path to a first position 90 where the antenna pattern 91 or a portion of it may be obtained, for example, by circling about the point 90. Subsequently, the airplane reaches the position 92 from which the antenna pattern 93 is obtained in the same fashion as it was obtained in position 90. For each of the two positions 90 and 92 the headings of the plane are correlated with the pattern received and its location is determined in the manner previously described.

This makes it possible to determine the included angle $\alpha$ to the target 46 as previously explained. Because the antenna pattern is so distinctive the pattern obtained at one region on the flight is matched to the pattern obtained elsewhere on the flight path, and this, of course, permits to determine the angle $\alpha$. It should be noted that the method of convergence of the present invention permits making angle measurements of usable precision even though the directional behavior of the antenna's subsystem may vary over a wide range of quality.

It should be noted that the method which makes use of an antenna pattern requires only a single antenna. Thus, the collector system consisting of a single antenna has a response to the target which is directionally dependent and may be expressed as $$p = f(\theta) \tag{5}$$

In other words the pattern amplitude $p$ is a function of the relative bearing $\theta$. It will be understood that it is again necessary to construct the circle as previously discussed for determining a target. This process is repeated at a third point to produce a second circle whose intersection with the first circle determines the location of the target as previously explained.

In accordance with the present invention it is further feasible to determine the location of the radiating target by means of a mapping function. Thus, at a first point of the flight path both a relative bearing to the target and an image of the area overflown which includes the target is obtained. Such an image may be obtained by a photographic camera, a television pickup tube, an infrared scanning system or a mapping radar. The bore sight of the image producing device must be fixed with respect to the bore sight of the direction finder.

Figure 10:
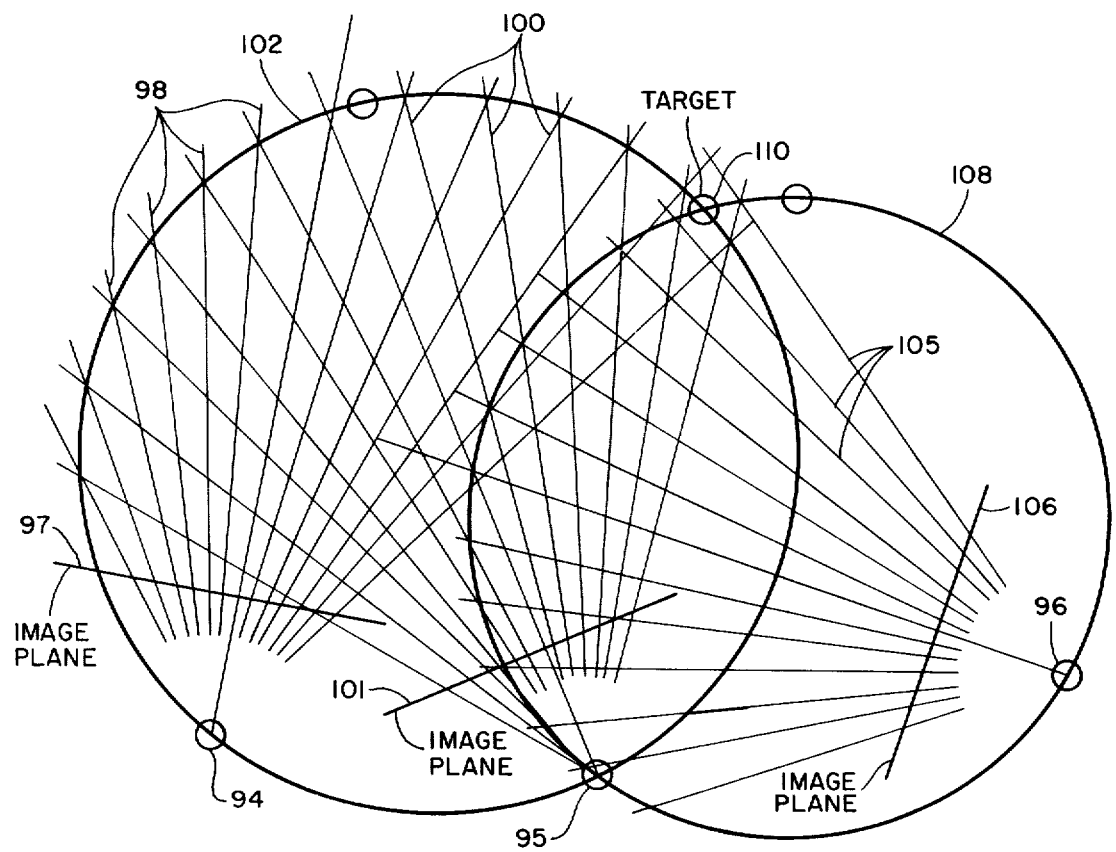
FIG. 10 illustrates a sketch for determining the location of a target by means of a plurality of known landmarks from three different flight positions, thereby to determine the location of the target without a knowledge of the plane's geographic location or heading.

FIG. 10 to which reference is now made illustrates successive flight path positions 94, 95 and 96 at which identical relative bearings are obtained on the target. For each of the three positions such as position 94 an image plane such as 97 may be obtained by the scanning or mapping system. Through the landmarks on the image plane 97 a plurality of lines such as 98 may be constructed, the lines intersecting at the position 94. Similarly, for position 95 another set of lines 100 may be constructed passing through the image plane 101. The lines 100 intersect at the position 95.

Circle 102 can now be constructed as the locus of the common points of the lines 98 and 100, that is of the points of the images of the two image planes 97 and 101 which have the same angle. This is the angle measured by the image forming device which corresponds to the angle measured by the direction finder.

Every landmark lying at the same angle in both images lies on a circular locus which includes the target because it also lies on the same angle when the images are obtained.

FIG. 10 to which reference is now made illustrates successive flight path positions 94, 95 and 96 at which identical relative bearings are obtained on the target. For each of the three positions such as position 94 an image plane such as 97 may be obtained by the scanning or mapping system. Through the landmarks on the image plane 97 a plurality of lines such as 98 may be constructed, the lines intersecting at the position 94. Similarly, for position 95 another set of lines 100 may be constructed passing through the image plane 101. The lines 100 intersect at the position 95.

Circle 102 can now be constructed as the locus of the common points of the lines 98 and 100, that is of the points of the images of the two image planes 97 and 101 which have the same angle. This is the angle measured by the image forming device which corresponds to the angle measured by the direction finder.

Every landmark lying at the same angle in both images lies on a circular locus which includes the target because it also lies on the same angle when the images are obtained.

Similarly, from the position 96 a set of lines 105 can be constructed passing through the image plane 106. A circle 108 may now be constructed which has a locus of the common points of lines 100 and 105. As before, the target lies at the common point of the circular loci.

Accordingly, instead of determining a plurality of relative bearing angles coupled with the heading and geographic location of the plane at each position, it is feasible to determine the target solely by means of relative bearing angles and landmarks adjacent to the target which are mapped in any conventional manner. This permits the construction of the two circles 102 and 108 and their intersecting point 110 is the location of the target. It will accordingly be obvious that this method does not require any navigation equipment or compass outside of a knowledge of a plurality of local landmarks which are mapped from the plane's position.

Figure 9:
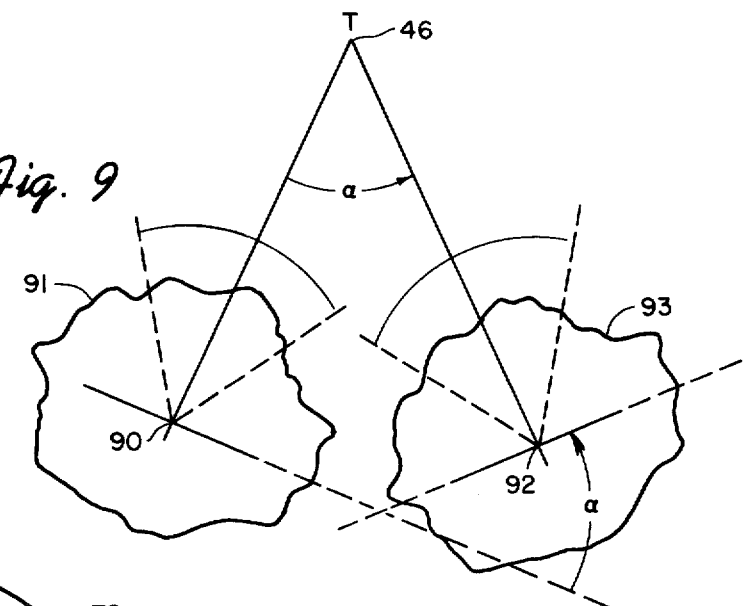
FIG. 9 shows two antenna patterns which have been obtained at two different points of a flight path for determining the convergence by making use of the spatial activity of the antenna patterns.

It is possible to calculate the mean errors in locating the target as a function of the distance of the target from the flight path. This is illustrated in FIG. 11 which shows again a dog leg type of flight path having two straight portions 72 and 73 with four points located at the two legs which are designated respectively as A,A and B,B to indicate equal bearing angles at the two points A and at the two points B. FIG. 11 illustrates a family of curves 74 each of which is designated by a number showing the error in miles which ranges in FIG. 11 from 0.2 to 0.7. A mileage scale is also shown in FIG. 9.

For this calculated error it has been assumed that the error is defined by a value of ±0.3 nautical miles in latitude and longitude which is not exceeded more than 5%. Similarly, the error for the aircraft heading was taken to be ±0.1°. Finally, it was assumed that the relative bearing angles match within ±0.5°. For the analysis it was assumed that the target location is obtained from a single pair of circles only. It will be understood that if more than two circles are used the error will be reduced.

Error curves similar to that of FIG. 11 may be calculated for other types of flight paths such as the ones shown in FIGS. 5, 6 and 7. It will be noted that the calculated errors are relatively small near the aircraft path and increase with distance from the aircraft path. The location accuracy is extremely good and may be less than 1% of the range. Also, the accuracy increases with the use of longer base lines and with the use of flight paths such as the dog leg of FIG. 11.

So far, the problem of locating a radiating target has been treated as a two dimensional problem. Actually, however, the airplane has a certain altitude above ground and a certain attitude with respect to the ground plane. However, it is easy to correct for the effects of the airplane's altitude and its attitude angle. One such correction technique which is convenient for computer use is described below. FIG. 12 again shows a flight path 75 which happens to be a dog leg flight path. The bearing angles are measured at four successive points 76, 77, 78 and 80. At these points the relative bearing angles $\theta_{1A}$, $\theta_{2A}$, $\theta_{1B}$ and $\theta_{2B}$ are measured. From these bearing angles the target location 81 may be determined or computed. The lines 82 schematically indicate the airplane's altitude with respect to a ground track 83.

It will now be found that since the target location was computed in two dimensions, that is with plane geometry the relative bearing angles computed will generally not match. In other words $\theta_{1A}$ is not equal to $\theta_{2A}$ is unequal to $\theta_{2B}$ when the attitude dimension is accounted for by assuming the relative bearing angles are cone angles measured from the antenna baseline.

However, the flight recording indicates that the respective relative bearing angles $\theta$ are matched or equal. The computed target location may now be corrected as shown in FIG. 13. The errors $e$ in the $\theta$ match are defined as follows. $e_A = \theta_{1A} - \theta_{1B}$ and $e_B = \theta_{2A} - \theta_{2B}$. The target location must now be moved until both errors $e_A$ and $e_B$ vanish at the same time. This may be effected by a process of iteration until the new target location 85 is determined. Thus, the iteration process continues until both errors vanish simultaneously and the new target location is readily determined in three dimensions. Thus, it will be seen that to locate the target in three dimensions is a simple and relatively easy correction.

This is an approximation method. An exact target location in three-dimensional space requires a match at one position in space of the two space angles determining a direction in space with those same two angles at a different position in space. The approximation is very good, however, because usually only small differences in elevation angles are involved between the matched points.

Figure 14A:
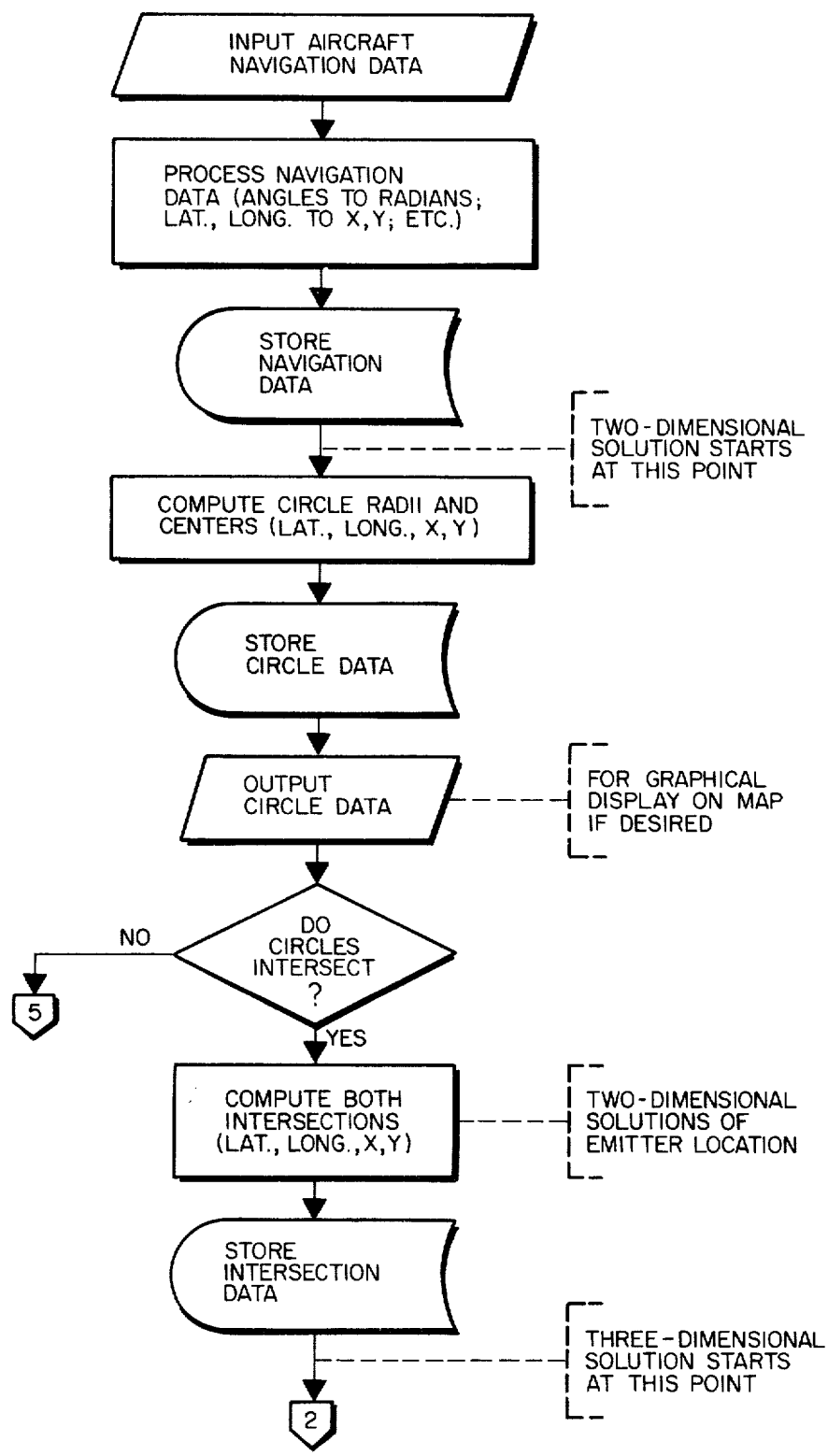
FIG. 14a, b and c represent a flow chart of the computer program or software program shown in FIG. 2b for calculating the location of the target.
Figure 14B:
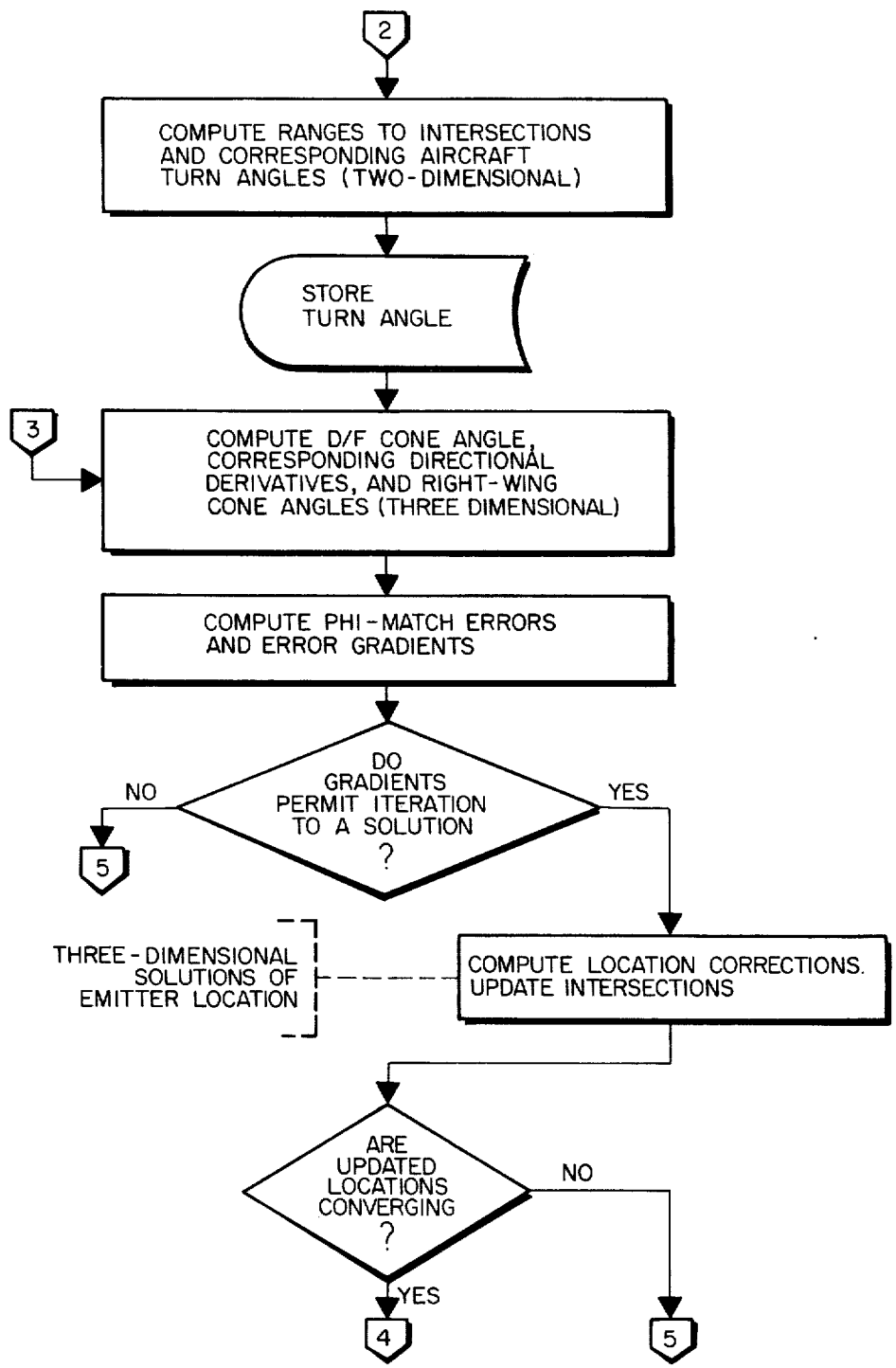
Figure 14C:
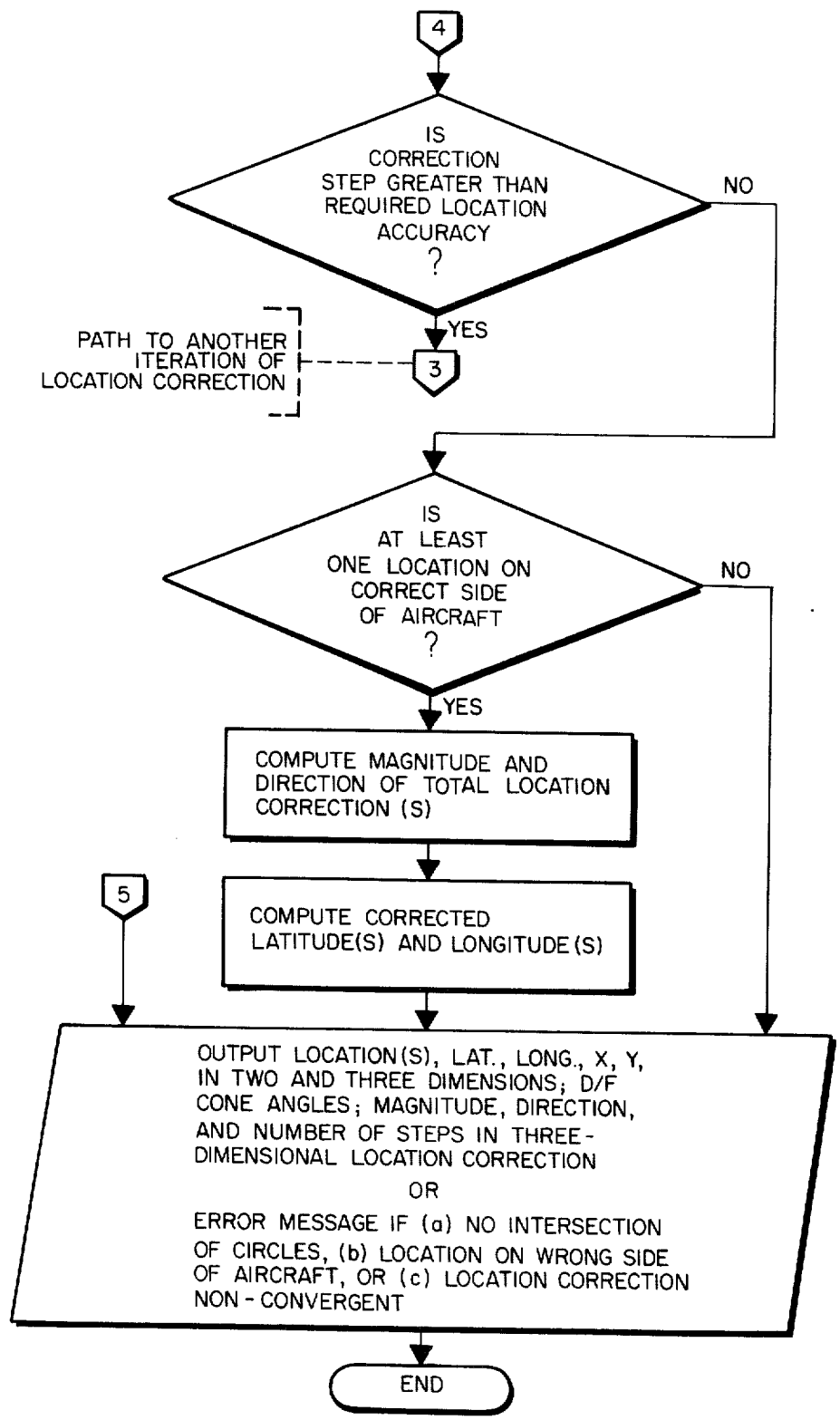

FIG. 14 to which reference is now made is a flow chart of the computer program or software program shown in FIG. 2b at 33. This flow chart illustrates how the two circles are calculated which are shown, for example, in FIG. 4 and how their intersection point is determined to find the location of the target. The flow chart subsequently illustrates how the location of the target in three dimensional space is subsequently calculated by an iteration method. The flow chart also shows by means of legends in dotted boxes where a new procedure starts to determine the portions of the program being calculated. The detailed machine language program is not made part of the record because it is believed to be well within the skill of the art. However, such a program has been filed in applicant's original application, Ser. No. 281,319 above referred to.

There has thus been disclosed a method of locating a target radiating a wave without the necessity of calibrating the direction-finding equipment of the airplane. Actually, the method of the invention makes use of the large errors connected with a determination of the target by electronic means. It is feasible to locate the target from four separate positions of a flight path and this may be reduced to three positions with equal relative bearing angles. In order to remove uncertainties which may be created by locating a target at the intersection of two circles, it is also feasible to determine three circles which uniquely locate the target. Alternatively, the target may be located by the relative bearing angles from two positions and the rate of change of the phase angles at those positions. A simple correction procedure has been described which corrects for the fact that the airplane has a certain attitude and altitude with respect to ground. Also, error curves have been shown to indicate the errors to be expected with a typical flight path and at different distances from the flight path.

What is claimed is:

1. The method of locating a target radiating a wave, comprising a moving platform carrying equipment for moving the platform, obtaining bearing angle, heading and location data, and additional equipment for operating upon the data including identifying identical bearing angles, the method comprising the steps of:
   a. moving the platform along an arbitrary flight path in the vicinity of the target;
   b. recording by means of the radiated wave for different positions of the platform along the flight path relative bearing angles to the target which may contain large errors;
   c. recording for different positions of the platform the heating thereof with respect to a known point;
   d. recording for different positions of the platform the location thereof with respect to a known landmark;
   e. identifying a first and a second position of the platform having a first and a second relative bearing angle with respect to the target;
   f. calculating, based on the bearing, heading and location data of the first and second positions, a portion of a first circle passing through the first and second positions of the platform and the target, the first circle being calculated from the distance between the first and second positions and the included angle from the first and second positions to the target;
   g. identifying a third and a fourth position of the platform having a third and a fourth relative bearing angle with respect to the target, the second relative bearing angle being determinable from the first relative bearing angle and the fourth relative bearing angle being determinable from the third relative bearing angle; and
   h. calculating, based on the bearing, heading and location data of the third and fourth positions a portion of a second circle passing through the third and fourth positions of the platform and the target, the second circle being calculated by the distance between the third and fourth positions and the included angle from the third and fourth positions to the target, whereby the target location is determined by the intersection of the two circle portions.

2. The method defined in claim 1 wherein the first relative bearing angle is equal to the second relative bearing angle.

3. The method defined in claim 1 wherein the third relative bearing angle is equal to the fourth relative bearing angle.

4. The method defined in claim 1 wherein the third position of the platform coincides with the second position, whereby the third relative bearing angle equals the second relative bearing angle and whereby the second circle is defined by the second and fourth positions of the platform and the target.

5. The method defined in claim 1 wherein the known landmarks are physically located in the vicinity of the target.

6. The method defined in claim 5 wherein an image of the vicinity of the target and of the known landmark is prepared; and the image of the landmark is then used to determine the location of the platform.

7. The method defined in claim 1 wherein a fifth position of the target is determined having the same relative bearing angle as one of said first and second or one of said third and fourth relative bearing angles, whereby a portion of a third circle may be calculated by means of the data relating to said fifth position, the third circle passing through said fifth position, said target and one of the other positions having the same bearing angle as said fifth position, thereby uniquely to determine the position of the target.

8. The method defined in claim 1 which includes the additional steps of:
   a. determining a fifth position of the platform having a fifth relative bearing angle to the target, determining a sixth position of the target having the same fifth relative bearing angle to the target, and calculating a third circle passing through the fifth and sixth position of the platform and the target, the third circle being calculated from the distance between the fifth and sixth positions and the included angle from the fifth and sixth positions to the target, thereby uniquely to determine the location of the target.

9. In the method of locating a target radiating a wave, comprising a platform moved along an arbitrary flight path in the vicinity of the target, the platform carrying equipment for obtaining and recording bearing angle, heading and location data, and additional equipment for operating upon the data including identifying identical bearing angles, the method of automatically performing the steps of:
   a. recording by means of the radiated wave for different positions of the platform along the flight path relative bearing angles to the target which may contain large errors;
   b. recording for different positions of the platform the heading thereof with respect to a known point;
   c. recording for different positions of the platform the location thereof with respect to a known landmark;
   d. identifying a first pair of positions of the platform, each having the same first relative bearing angle to the target;
   e. identifying at least a second pair of positions of the platform, each having the same second relative bearing angle to the target;
   f. calculating, based on the bearing, heading and location data of the first and second positions, a portion of a first circle passing through the first and second positions of the platform and the target, the first circle being calculated from the distance between the first and second positions and the included angle from the first and second positions to the target; and
   g. calculating, based on the bearing, heading and location data of the third and fourth positions, a portion of a second circle passing through the third and fourth positions of the platform and the target, the second circle being calculated from the distance between the third and fourth positions and the included angle to the target, whereby the target location is determined by the intersection of the two circle portions.

10. In the method of locating a target radiating a wave, comprising a platform moved along an arbitrary flight path in the vicinity of the target, the platform carrying equipment for obtaining bearing angle, rate of change thereof, heading and location data, and additional equipment for operating upon the data including identifying identical bearing angles, the method of performing the steps of:

a. determining by means of the radiated wave for different positions of the platform along the flight path relative bearing angles to the target which may contain large errors;
b. determining for different positions of the platform the rate of change of the relative bearing angle as a function of distance of the platform from a particular position;
c. determining for different positions of the platform the heading thereof with respect to a known point;
d. determining for different positions of the platform the location thereof with respect to a known landmark;
e. identifying two positions of the platform, each having the same first relative bearing angle to the target;
f. determining the rate of change of the bearing angle as a function of distance from the first and the second position;
g. calculating, based on the bearing, rate of change thereof, heading and location data of the first and second positions, a portion of a circle passing through the first and second positions of the platform and the target, the circle being calculated from the distance between the first and second positions and the included angle from the first and second positions to the target; and
h. calculating the position of the target on the portion of the circle by the intersection of two lengths $L_1$ and $L_2$, the length $L_1$ extending from the first position to the target and the length $L_2$ intersecting the length $L_1$ from the second position to the target, the ratio $L_2/L_1$ being determined by the ratio of the rate of change of the bearing angle at the first position to the rate of change of the bearing angle of the second position.

11. The method of locating a target radiating a wave, comprising a moving platform carrying equipment for moving the platform, recording and obtaining bearing angle, determining rate of change of phase angle, heading and location data, and additional equipment for operating upon the data including identifying identical bearing angles, the method comprising the steps of:

a. moving the platform along an arbitrary flight path in the vicinity of the target;
b. recording by means of the radiated wave for different positions of the platform along the flight path relative bearing angles to the target which may contain large errors;
c. determining the rate of change of an interferometric phase angle determined from a first relative bearing angle as a function of distance of the platform from a first associated position and determining the rate of change of an interferometric phase angle derived from the first relative bearing angle as a function of distance from a second position having the same first relative bearing angle;
d. determining for different positions of the platform the heading thereof with respect to a known point;
e. determining for different positions of the platform the location thereof with respect to a known landmark;
i. calculating, based on the bearing, heading and location data of the first and second positions, a portion of a circle passing through the first and second positions of the platform and the target, the first circle being calculated from the distance between the first and second positions and the included angle from the first and second positions and the included angle from the first and second positions to the target; and
j. calculating the position of the target on the portion of the circle by the intersection of two lengths $L_1$ and $L_2$, the length $L_1$ extending from the first position to the target and the length $L_2$ intersecting the length $L_1$ from the second position to the target, and the ratio $L_2/L_1$ being determined by the ratio of the rate of change of the interferometric phase angle at the first position to the rate of change of the interferometric phase angle at the second position.

12. The method of locating a target radiating a wave, comprising a moving platform carrying equipment for moving the platform, determining location and heading data and antenna radiation patterns, and additional equipment for operating upon the data and correlating antenna patterns, the method of automatically performing the steps of:

a. moving the platform along an arbitrary flight path in the vicinity of the target;
b. generating antenna radiation patterns near a first, a second and a third position along the flight path in response to the radiation of the target, the antenna patterns being a function of direction;
c. determining the location and heading of the platform at the first, second and third position with respect to a known landmark;
d. calculating, based on the antenna radiation pattern and location data of the first and second positions, a portion of a first circle passing through the first and second positions of the platform and the target, the first circle being calculated from the distance between the first and second positions and the included angle from the first and second positions to the target; and
e. calculating based on the antenna radiation pattern and location data of the three positions, a portion of a second circle passing through the third and one of the first and second positions of the platform and target, the second circle being calculated from the distance between the third and one of the first and second positions and the included angle from the third and one of the first and second positions to the target, whereby the target location is defined by the intersection of the two circle portions.

13. The method of locating a target radiating a wave, comprising a moving platform carrying equipment for moving the platform, obtaining and recording bearing angle and for mapping landmarks, and additional equipment for operating upon the data, the method comprising the steps of:

a. moving the platform along an arbitrary flight path in the vicinity of the target;
b. recording by means of the radiated wave for different positions of the platform along the flight path relative bearing angles to the target which may contain large errors;
c. mapping a first plurality of landmarks at a first position of the platform and a second plurality of landmarks at a second position of the platform and a third plurality of landmarks at a third position of the platform, said second and third positions having the same relative bearing angle as the first position.

d. calculating, based on the bearing and landmark mapping data, a portion of a first circle passing through the first and second positions of the platform and the target, the first circle passing through those landmarks which during the first and second mapping steps have the same angle, said angle corresponding to the angle determined by the first relative bearing; and e. calculating, based on the bearing and landmark data a portion of a second circle passing through the second and third positions of the platform and the target, the second circle passing through those landmarks which during the second and third mapping steps have the same angle, said angle corresponding to the angle determined by the first relative bearing, whereby the target location is defined by the intersection of the two circle portions.

14. The method of locating a target radiating a wave, comprising two moving platforms, each carrying equipment for obtaining bearing angle, heading and location data, and additional equipment for operating upon the data including identifying identical bearing angles, the method of performing the steps of:

a. recording by means of the radiated wave for different positions of the first platform along the flight path relative bearing angle to the target which may contain large errors;

b. recording for different positions of the first platform the heading thereof with respect to a known point;

c. recording for different positions of the first platform the location thereof with respect to a known landmark;

d. recording by means of the radiated wave for different positions of the second platform along the flight path relative bearing angles to the target;

e. recording for different positions of the second platform the heading thereof with respect to a known point;

f. recording for different positions of the second platform the location thereof with respect to the known landmark;

g. identifying a first position of the first platform and a second position of the second platform different from the first position, each having a first and a second relative bearing angle different from each other;

h. identifying a third position of the first platform and a fourth position of the second platform, the third position having the same first relative bearing angle and the fourth position having the same second relative bearing angle;

i. calculating, based on the bearing, heading and location data, a portion of a first circle passing through the first and third positions of the two platforms and the target, the first circle being calculated from the distance between the first and third positions of the two platforms and the included angle from the first and third positions of the two platforms to the target; and j. calculating a portion of a second circle passing through the second and fourth positions of the two platforms and the target, the second circle being calculated from the distance between the second and fourth positions of the platforms and the included angle from the second and fourth positions of the platforms to the target, whereby the target location is defined by the intersection of the two circle portions.

* * * * *